(No Model.) 6 Sheets—Sheet 1.

R. H. LAPAGE.
COMPOUND LOCOMOTIVE ENGINE.

No. 405,570. Patented June 18, 1889.

Witnesses
Inventor
Richard H. Lapage
by Wm. H. Doolittle
Atty.

(No Model.) 6 Sheets—Sheet 4.

R. H. LAPAGE.
COMPOUND LOCOMOTIVE ENGINE.

No. 405,570. Patented June 18, 1889.

(No Model.) 6 Sheets—Sheet 5.
R. H. LAPAGE.
COMPOUND LOCOMOTIVE ENGINE.

No. 405,570. Patented June 18, 1889.

Witnesses
Jos. H. Blackwood
W. J. McGinness

Inventor
Richard H. Lapage
by Wm. H. Doolittle
Atty (No Model.) 6 Sheets—Sheet 6.
R. H. LAPAGE.
COMPOUND LOCOMOTIVE ENGINE.
No. 405,570. Patented June 18, 1889.
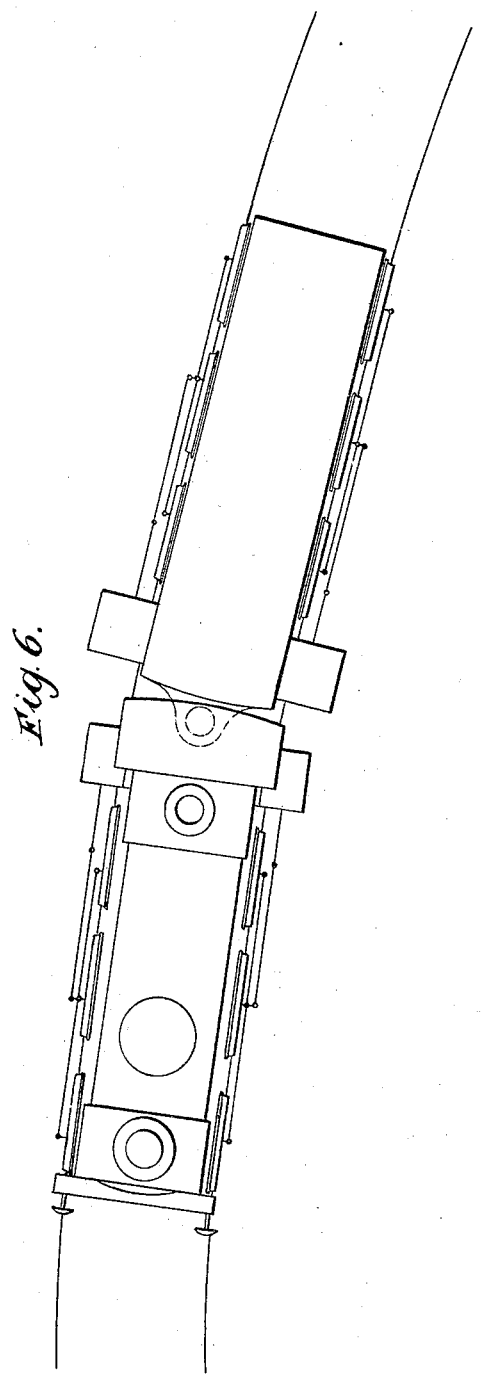

UNITED STATES PATENT OFFICE.

RICHARD HERBERT LAPAGE, OF WESTMINSTER, ENGLAND.

COMPOUND LOCOMOTIVE-ENGINE.

SPECIFICATION forming part of Letters Patent No. 405,570, dated June 18, 1889.

Application filed December 30, 1887. Serial No. 259,430. (No model.)

*To all whom it may concern:*

Be it known that I, RICHARD HERBERT LA-PAGE, a subject of the Queen of Great Britain and Ireland, residing at the city of Westminster, Kingdom of Great Britain and Ireland, have invented Improvements in Compound Locomotive-Engines, of which the following is a specification.

Locomotives have been constructed with cylinders mounted upon bogies; but such types of engines have been open to objection in practice, because the necessary working-joint in the steam-pipe could not be relied upon to keep tight at the high pressures ordinarily employed. Now, according to my invention, to obviate this defect, I mount the low-pressure cylinder or cylinders upon a bogie or frame that can swivel with coupled wheels, and locate the working-joint in the steam-pipe or connection between the high and low pressure cylinders, so that such joint is not when compounding subjected to the higher pressure, but has to bear such higher pressure only on exceptional occasions when high-pressure steam is introduced direct to the low-pressure cylinder or cylinders at starting or when extra power is required for other purpose. The high-pressure engine may drive coupled wheels. In some cases, instead of mounting the low-pressure cylinder or cylinders upon a bogie, the same may be mounted upon a tender or vehicle, a connected pipe being provided to the high-pressure cylinder or cylinders of the locomotive proper, and a suitable steam-tight working-joint being introduced into the said pipe or connection.

The working-joints employed in carrying out my invention may be of various kinds, and various designs of engines may be constructed to operate on the principle of my invention, as above set forth.

Figure 1:
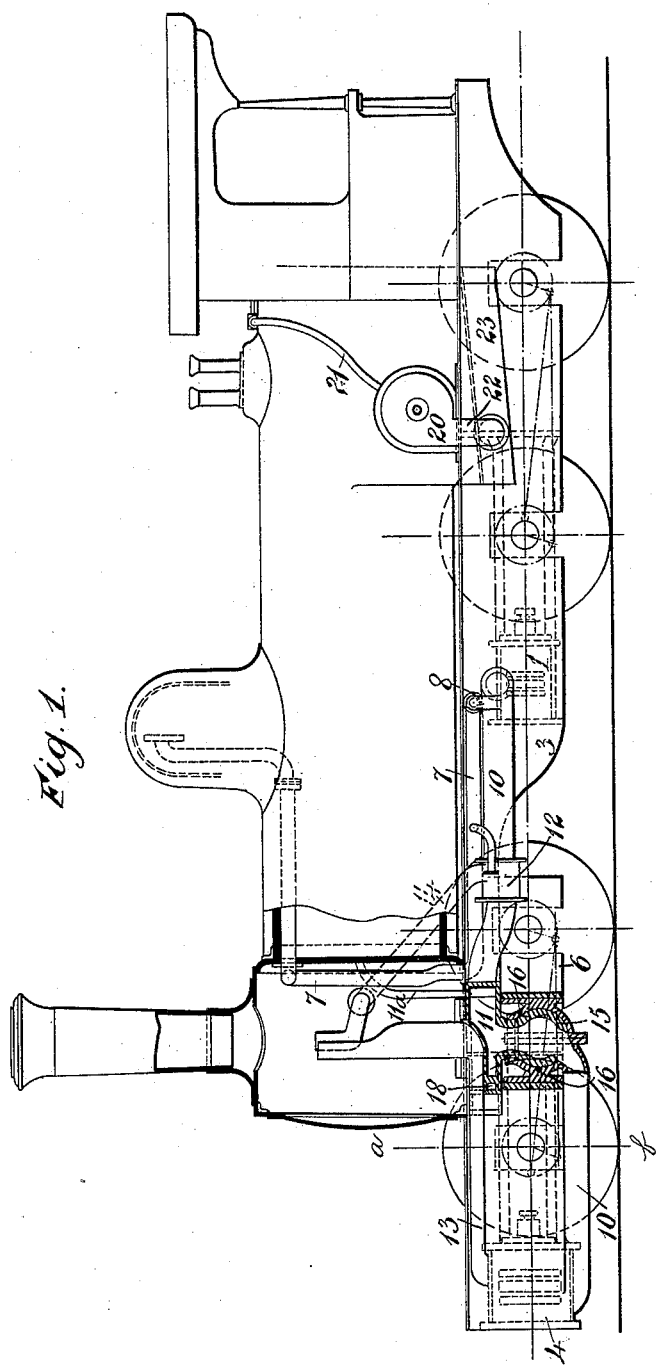
Figure 2:
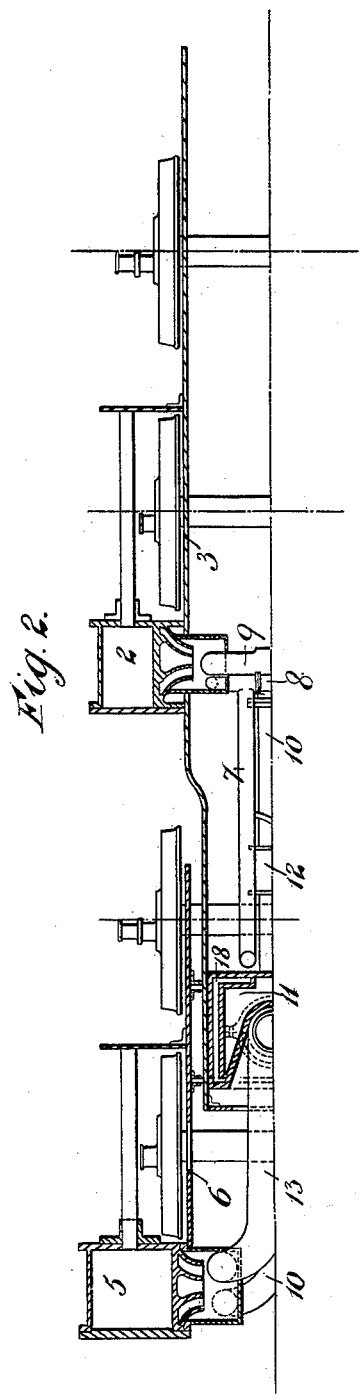
Figure 3:
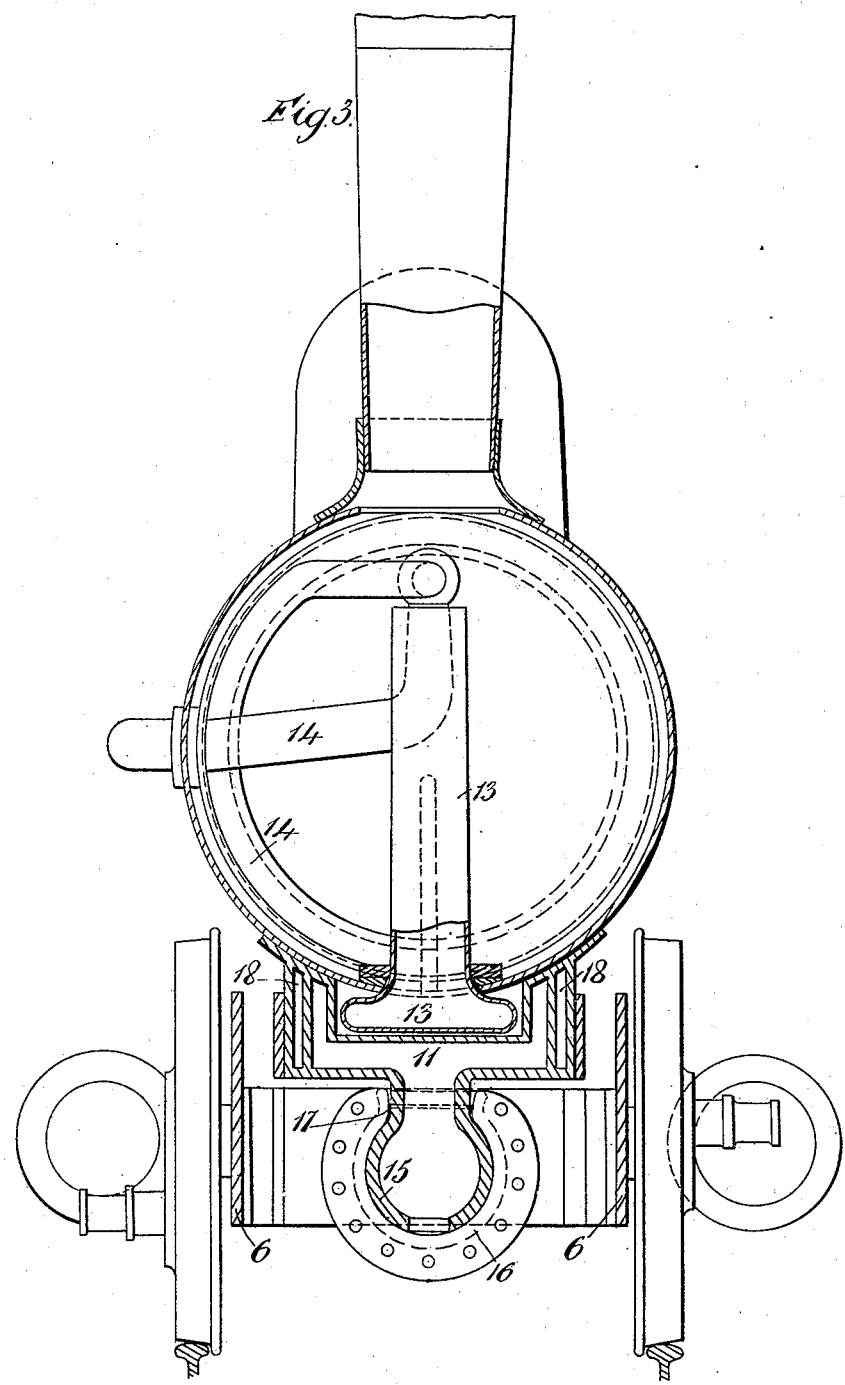
Figure 4:
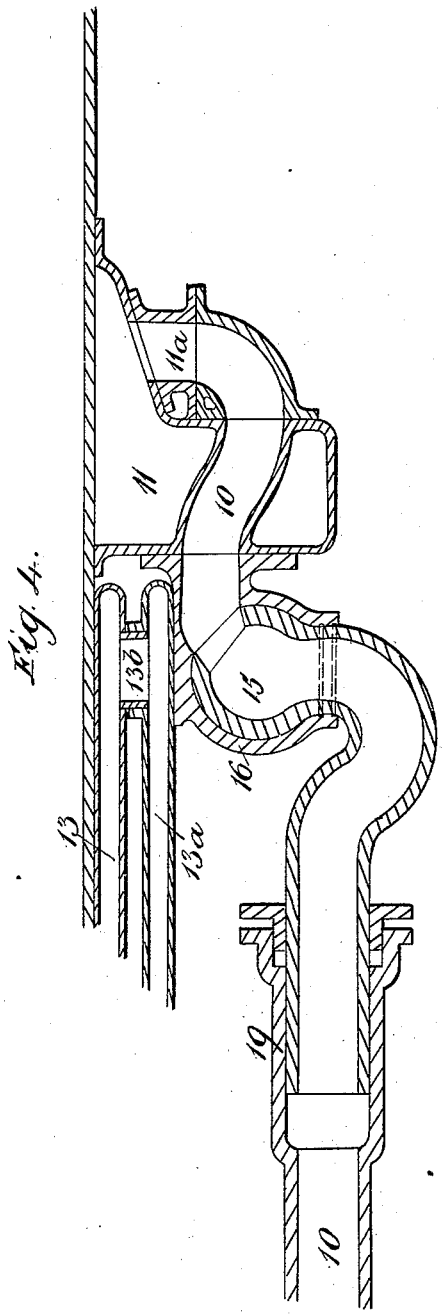
Figure 5:
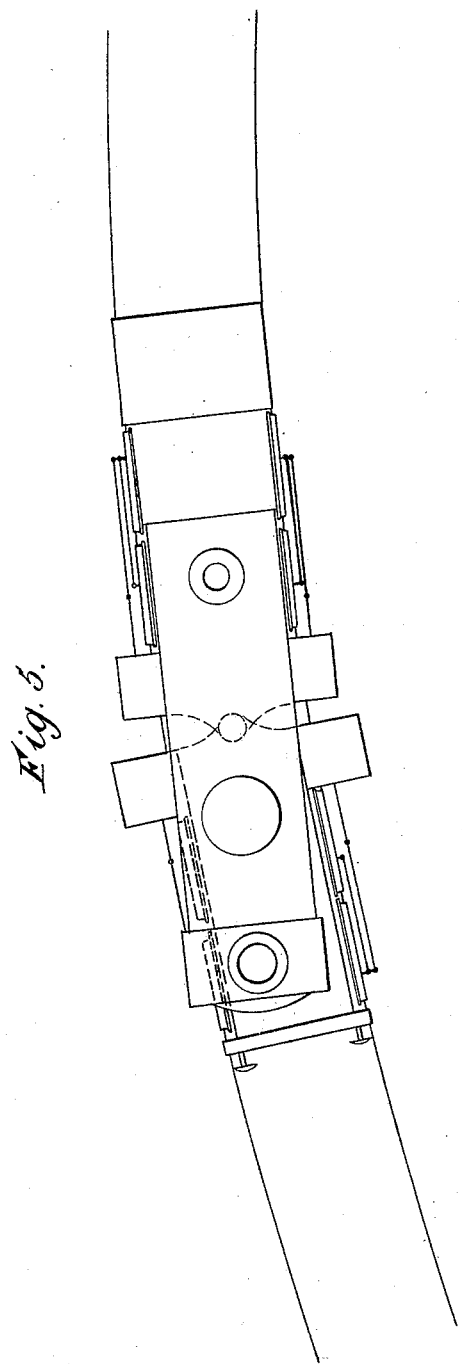

In the accompanying six sheets of illustrative drawings, Figures 1 and 2 are respectively an elevation and a half plan or top view, both partly in section, illustrating an arrangement of a compound locomotive-engine in which the low-pressure cylinders are mounted upon a bogie-truck or swivel-frame in accordance with my invention. Fig. 3 is a vertical section on the line A B, Fig. 1. It is drawn to a larger scale than Figs. 1 and 2. Fig. 4 is a sectional detail view; and Figs. 5 and 6 are diagrammatic views, hereinafter referred to.

1 and 2 are the high-pressure cylinders mounted upon the main frame 3 of the locomotive.

4 and 5 are the low-pressure cylinders, which, according to this invention, are mounted upon a bogie-frame or swivel-truck 6, which is connected to the main frame 3 by a ball-and-socket joint, hereinafter described.

7 and 8 are pipes for conveying high-pressure steam to the cylinders 1 and 2.

9 and 10 are connecting-pipes for conveying exhaust-steam from the high-pressure cylinders to the low-pressure cylinders. These pipes may be in communication with the low-pressure cylinders by way of an intermediate chamber or receiver 11 and a valve-casing 12, containing combined intercepting and starting valves and high-pressure exhaust-valve, the construction and arrangement of which may be similar to that described and shown in the specification of an application for Letters Patent of the United States of even date herewith, Serial No. 259,429. In some cases—as, for instance, when more than one high and one low pressure cylinder are used—the valve-casing 12 and contained valves may be dispensed with.

13 is the low-pressure exhaust-pipe terminating in the smoke-box.

14 is a high-pressure exhaust-pipe also terminating in the smoke-box. It is placed in communication with the connecting-pipe 10 by a passage that is controlled by a high-pressure exhaust-valve that may be arranged and operated substantially in the manner described in the hereinbefore-mentioned separate application for Letters Patent of the United States. The exhaust-pipes may in some cases be arranged to terminate in a condenser.

The intermediate chamber or receiver 11 is rigidly secured to the main frame 3, and is formed with a hollow ball 15, open at its lower end and in free communication with the said chamber or receiver 11 and forward part of the connecting-pipe 10. The hollow ball 15 is inclosed by two parts 16, forming a socket of partly spherical form internally. This socket is secured to the bogie-truck or swivel-frame 6. The ball and socket are, in the example shown, formed so as to permit of slight play at the upper part or neck, and one or more spring packing-rings 17 is or are inserted between them (shown more clearly in Fig. 3) to maintain a tight joint while at the same time permitting of a small turning movement in a vertical plane; or in lieu of the packing-rings a stuffing-box and gland may be employed. The steam being discharged through the bottom of the ball 15 will tend to raise such ball, and consequently to tighten the bearing surfaces or joint between it and the socket at the upper part thereof. The joint being subjected to low-pressure steam only, except when high-pressure steam is used in the low-pressure cylinder when greater power is required, there will not be the same difficulty in maintaining a tight joint, as is the case where the joint is required to withstand high pressure. The intermediate chamber or receiver 11 may, as in the example shown, be steam-jacketed to increase the temperature of the steam passing to the low-pressure cylinders. For this purpose it is shown formed with a steam-space 18, to which steam from the boiler is admitted by one or more pipes 11$^a$.

The swiveling connection between the high and low pressure cylinders may be arranged elsewhere than at the bogie-pivot below the smoke-box. Thus the working-joint may be arranged as shown in Fig. 4, in which the socket 16 is carried, it may be, by the bottom of the boiler, or by the fixed frame, or by the foot-plate of the locomotive, the ball 15 being secured, it may be, to the swivel-frame, at a convenient point between the sets of axles driven by the high and low pressure cylinders, or to a tender or other vehicle. In this arrangement the ball is free to move with the bogie or swivel frame or with the tender or other vehicle, as the case may be.

19 is a telescopic sliding joint in the connecting-pipe 10 between the high and low pressure cylinders. This form of joint admits of the high and the low pressure engines, when the latter are carried by a tender or other vehicle, moving toward and from each other, as would be necessary to allow of the play of the buffers between the said locomotive and tender or other vehicle. It also admits of the bogie or swivel frame or the tender or vehicle, as the case may be, turning through a small angle in a vertical frame.

13 13$^a$ are parts of the low-pressure exhaust-pipe in communication with each other by a pipe 13$^b$ and with the atmosphere or a condenser. The part 13 is carried by the bogie or swivel frame or by the tender or vehicle, and the part 13$^a$ by the main frame of the locomotive, the pipe 13$^b$ being arranged above the ball-and-socket joint 15 16, and so as to be able to turn in a suitable socket carried by the part 13$^a$, as shown.

11 is a high-pressure exhaust chamber or receiver. An intercepting-valve may, if desired, be placed at 11$^a$.

If desired, the exhaust-pipes 13 and 13$^a$ may be connected by a flexible joint of other construction than that shown.

The arrangement shown in the diagrammatic view Fig. 5 admits of the easy passage of the bogie or swivel frame round curves when running either backward or forward. It also admits of the connecting-pipes between the high and low pressure cylinders being shortened by arranging the cylinders of the low-pressure engine at the rear instead of at the front of the bogie or swivel frame, as in the arrangement shown in Figs. 1 and 2. Fig. 6 is a similar view to Fig. 5, illustrating a tender fitted with the low-pressure cylinders and connected with the locomotive by a swivel or other joint, which may be similar to those hereinbefore described.

When the main frame does not extend to the smoke-box, as may be the case when the arrangement shown in Fig. 4 is employed and as shown in Fig. 5, anti-friction wheels or rollers or the like may be interposed between the boiler and the bogie-truck or swivel-frame. The high and the low pressure engines are each, in the example shown in Figs. 1 and 2, arranged to drive four coupled wheels; but they may obviously be arranged to drive a greater or a less number of such wheels. When the low-pressure cylinders are arranged on a tender or other vehicle, the pipe connecting them with the high-pressure cylinders is provided with any suitable form of swiveling or working joint or joints to admit of movement of the tender relatively to the locomotive; but I prefer to use joints such as those shown in Fig. 4.

It will be obvious that a locomotive-engine may be fitted with a bogie or swivel frame at each end of the fixed engine and both bogie-engines worked by low-pressure steam from the fixed engine, as hereinbefore described. In the case of tram-engines the end of a carriage may rest on one of the swivel-frames. The boiler for the engines may be of any convenient type.

For increasing the draft through the furnace, when necessary—as, for instance, when the exhaust-steam is led to a condenser—a centrifugal fan or blowing apparatus 20 may be used. The fan may be driven by an engine supplied with steam through a pipe 21, or it may be driven from one of the locomotive-axles, the arrangement being such that the fan may be started or stopped, according to requirement.

22 is a pipe for conducting the air to the closed ash-pan 23.

What I claim is—

1. In a compound locomotive-engine, the combination of a high-pressure cylinder or cylinders mounted upon the locomotive proper, a low-pressure cylinder or cylinders mounted upon a bogie or vehicle connected to said locomotive proper, pipes or passages connecting said high and low pressure cylinders, and a ball-and-socket joint between said pipes, said ball-and-socket joint forming a pivot for said bogie or vehicle and comprising a ball 15 and a socket 16, one of these parts being secured to said locomotive proper and the other to said bogie or vehicle, substantially as herein described.

2. In a compound locomotive-engine, the combination of a high-pressure cylinder or cylinders mounted upon the locomotive proper, a low-pressure cylinder or cylinders mounted upon a bogie or vehicle connected to said locomotive proper, pipes or passages connecting said high and low pressure cylinders, a ball-and-socket joint connecting said pipes or passages, forming a pivot for said bogie or vehicle, and comprising a ball 15 and a socket 16, one of these being connected to said locomotive proper and the other to said bogie or vehicle, and a sliding or telescopic joint 19 between parts of said pipes or passages, substantially as herein described, for the purpose specified.

3. In a compound locomotive-engine, the combination of high-pressure cylinders 1 and 2, mounted upon the main frame 3 of the locomotive, low-pressure cylinders 4 and 5, mounted upon a bogie-truck or swivel-frame 6, pipes or passages 9 and 10, connecting said high and low pressure cylinders, hollow ball 15 and parts 16, forming a ball-and-socket joint between parts of said pipe or passage 10 and an exhaust-pipe, one part of said ball-and-socket joint being carried by the main frame and the other part by the bogie-truck or swivel-frame, substantially as herein described, for the purpose specified.

4. In a compound locomotive-engine, the combination of high-pressure cylinders mounted upon the main frame of the locomotive, low-pressure cylinders mounted upon a bogie-truck or swivel-frame, pipes or passages 9 and 10, connecting said high and low pressure cylinders, a ball-and-socket joint connecting parts of said pipe 10, a telescopic joint 19, arranged between parts of said connecting-pipe 10, and exhaust-pipe constructed in two parts 13 and 13$^a$, said parts being connected with each other by a working-joint and placed in communication with each other by a pipe 13$^b$, arranged above the ball-and-socket joint, substantially as described, for the purposes specified.

In testimony whereof I have signed my name to this specification in the presence of two subscribing witnesses.

RICHARD HERBERT LAPAGE.

Witnesses:
F. J. BROUGHAM,
CHARLES E. BROUGHAM,
*Both of 46 Lincoln's Inn Fields, London, W. C.*